(12) United States Patent
Yamaguchi et al.

(10) Patent No.: US 9,563,311 B2
(45) Date of Patent: Feb. 7, 2017

(54) TOUCH TYPE INPUT DEVICE AND METHOD FOR DETECTING TOUCHING OF TOUCH PANEL

(71) Applicants: KABUSHIKI KAISHA TOKAI RIKA DENKI SEISAKUSHO, Aichi (JP); SMK CORPORATION, Tokyo (JP)

(72) Inventors: Syogo Yamaguchi, Aichi (JP); Osamu Yoshikawa, Tokyo (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/264,393

(22) Filed: Apr. 29, 2014

(65) Prior Publication Data

US 2014/0333576 A1   Nov. 13, 2014

(30) Foreign Application Priority Data

May 10, 2013   (JP) ................................. 2013-100445

(51) Int. Cl.
*G06F 3/045* (2006.01)
*G06F 3/041* (2006.01)
*G06F 3/044* (2006.01)

(52) U.S. Cl.
CPC ............. *G06F 3/0418* (2013.01); *G06F 3/044* (2013.01)

(58) Field of Classification Search
CPC ............................... G06F 3/044; G06F 3/0418
USPC ........................................................ 345/174
See application file for complete search history.

(56) References Cited

U.S. PATENT DOCUMENTS

| | | |
|---|---|---|
| 2008/0111714 A1 | 5/2008 | Kremin |
| 2008/0158174 A1 | 7/2008 | Land et al. |
| 2011/0141047 A1 | 6/2011 | Iwaizumi et al. |
| 2012/0050214 A1* | 3/2012 | Kremin et al. ............... 345/174 |

(Continued)

FOREIGN PATENT DOCUMENTS

| | | |
|---|---|---|
| JP | 2010-009321 | 1/2010 |
| JP | 4994489 | 5/2012 |

OTHER PUBLICATIONS

U.S. Appl. No. 14/136,159 to Syogo Yamaguchi et al., filed Dec. 20, 2013.

(Continued)

*Primary Examiner* — Mark Regn
(74) *Attorney, Agent, or Firm* — Greenblum & Bernstein, P.L.C.

(57) ABSTRACT

A touch type input device includes a touch panel having a sensor array of drive electrodes and sensor electrodes. Capacitors are formed at intersections of the drive electrodes and the sensor electrodes. A controller determines whether or not a conductive foreign matter exists on the touch panel from raw data values indicating a change amount in the capacitance of each capacitor from an initial reference value. Further, the controller determines whether or not the touch panel has been touched from control data values indicating a change amount in the capacitance of each capacitor from a control reference value that is changed for each capacitor in accordance with whether or not the foreign matter exists. When the raw data values indicate the existence of the foreign matter, the controller sets the control reference value of each capacitor to a raw data reference value corresponding to the present raw data value.

4 Claims, 5 Drawing Sheets

(56) References Cited

U.S. PATENT DOCUMENTS

2012/0293447 A1* 11/2012 Heng ................ G06F 3/0418
 345/174
2013/0207935 A1* 8/2013 Toda et al. ................ 345/174
2014/0106125 A1 4/2014 Tatai
2014/0118275 A1 5/2014 Ito et al.

OTHER PUBLICATIONS

Extended European Search Report in EP 14167111.5, dated Jul. 15, 2016.

* cited by examiner

TOUCH TYPE INPUT DEVICE AND METHOD FOR DETECTING TOUCHING OF TOUCH PANEL

CROSS-REFERENCE TO RELATED APPLICATIONS

This application is based upon and claims the benefit of priority from prior Japanese Patent Application No. 2013-100445, filed on May 10, 2013, the entire contents of which are incorporated herein by reference.

FIELD

The present invention relates to a touch type input device and a method for detecting touching of a touch panel.

BACKGROUND

Japanese Laid-Open Patent Publication No. 2010-9321 describes a touch type input device including a touch panel that is touched to operate virtual buttons shown on a display. In the touch type input device, for example, a user touches an operation surface of the touch panel to select one of a plurality of functional items shown on the display. This allows the user to view the desired interface on the display or operate an onboard device. Such touching of the touch panel includes, in addition to a simple touch of the operation surface, swiping or flicking of the operation surface in which a finger is moved along the operation surface in a single direction. For example, by swiping or flicking the operation surface, the interface shown on the display is scrolled.

Such a touch panel may implement projected capacitive technology. A projected capacitance type touch panel includes drive electrodes and sensor electrodes that are arranged in a grid-shaped pattern. Capacitors are formed at the intersecting points of the drive electrodes and the sensor electrodes. Touching of the touch panel is detected from the capacitance of each capacitor. A mutual capacitance type touch panel detects a touched position based on changes in the capacitance of each capacitor. The mutual capacitance type touch panel is advantageous in that a number of touch positions may be simultaneously detected.

A conductive foreign matter such as a water droplet or a coin may contact or collect on the operation surface of the touch panel. The contact of such a foreign matter needs to be distinguished from a finger that touches the operation surface. In a mutual capacitance type touch panel, when a finger contacts the operation surface, the capacitance of each capacitor in the area touched by the finger changes from a reference value (zero), which corresponds to a condition in which there is no object contacting the operation surface, toward a first polarity side (e.g., positive). In contrast, when a foreign matter contacts the operation surface, the capacitance of each capacitor in the area that is in contact with the foreign matter changes toward a second polarity side (e.g., negative), and the capacitance of each capacitor in the area around the foreign matter changes toward the first polarity side. Japanese Patent No. 4994489 describes a touch type input device that takes this into consideration. The touch type input device computes the distribution of the amount of change in capacitance of the capacitors. When the peak value of the changed amount distribution is less than or equal to a predetermined negative threshold, the touch type input device determines that a foreign matter is contacting the operation surface.

When a conductive foreign matter remains in contact with the operation surface of the touch panel, the capacitance of each capacitor remains changed from the reference value. This hinders the detection of a touch. Thus, the touch type input device of Japanese Patent No. 4994489 shows a message on a display to prompt the user to remove the foreign matter from the touch panel.

However, in the touch type input device described above, the conductive foreign matter has to be removed from the operation surface to allow for detection of the touching of the operation surface. This is inconvenient, especially, when the touch type input device is installed in a vehicle and a foreign matter cannot be readily removed from the operation surface.

SUMMARY

One aspect of the present invention is a touch type input device. The touch type input device includes a touch panel. The touch panel includes a sensor array and an operation surface. The sensor array includes drive electrodes and sensor electrodes insulated from and stacked on the drive electrodes. The drive electrodes and the sensor electrodes are arranged in a grid-shaped pattern that forms capacitors at intersections of the drive electrodes and the sensor electrodes. The touch type input device further includes a controller that applies a drive signal to the drive electrodes and detects touching of the operation surface of the touch panel from changes in capacitance of each capacitor. The controller determines whether or not a conductive foreign matter exists on the operation surface from raw data values indicating a change amount in the capacitance of each capacitor from an initial reference value that is set in advance for each capacitor. The controller determines whether or not the operation surface has been touched from control data values indicating a change amount in the capacitance of each capacitor from a control reference value that is changed for each capacitor in accordance with whether or not the conductive foreign matter exists. When the controller determines from the raw data values that the conductive foreign matter exists on the operation surface, the controller sets the control reference value of each capacitor to a raw data reference value corresponding to the present raw data value. When the controller determines from the raw data values that the conductive foreign matter does not exist on the operation surface, the controller sets the control reference value of each capacitor to the initial reference value.

Another aspect of the present invention is a method for detecting touching of a touch panel regardless of the existence of a conductive foreign matter on the touch panel, wherein the touch panel includes a sensor array and an operation surface, the sensor array includes drive electrodes and sensor electrodes insulated from and stacked on the drive electrodes, the drive electrodes and the sensor electrodes are arranged in a grid-shaped pattern that forms capacitors at intersections of the drive electrodes and the sensor electrodes. The method includes applying a drive signal to the drive electrodes, detecting capacitance of each capacitor from a charge-discharge current flowing through a corresponding one of the sensor electrodes in accordance with the drive signal applied to a corresponding one of the drive electrodes, and detecting touching of the operation surface of the touch panel from changes in capacitance of each capacitor. The detecting touching of the operation surface includes determining whether or not a conductive foreign matter exists on the operation surface from raw data values indicating a change amount in the capacitance of each capacitor from an initial reference value that is set in advance for each capacitor, determining whether or not the operation surface has been touched from control data values indicating a change amount in the capacitance of each capacitor from a control reference value that is changed for each capacitor in accordance with whether or not the conductive foreign matter exists, when the raw data values indicate the existence of the conductive foreign matter on the operation surface, setting the control reference value of each capacitor to a raw data reference value corresponding to the present raw data value, and when the raw data values do not indicate the existence of the conductive foreign matter on the operation surface, setting the control reference value of each capacitor to the initial reference value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a touch type input device 5 will now be described with reference to the drawings.

Figure 1:
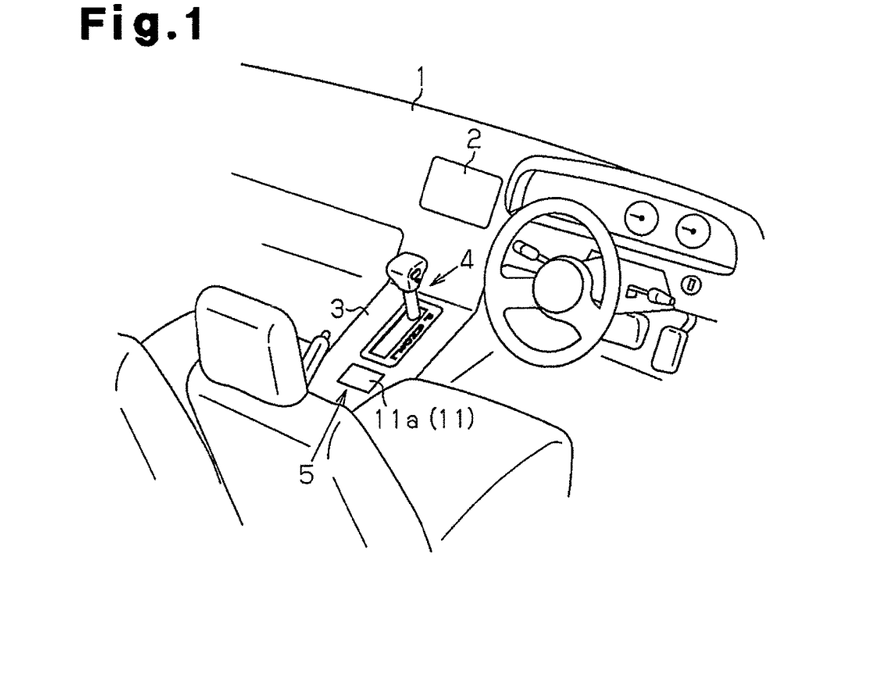
FIG. 1 is a perspective view illustrating a touch type input device installed in a vehicle.

Referring to FIG. 1, a dashboard 1 includes a central portion (center cluster) where a display 2 is set. A center console 3 includes a shift lever 4 and a touch type input device 5. The touch type input device 5 includes a touch panel 11 that is set on the center console 3 at the rear side of the shift lever 4. The touch panel 11 includes an operation surface 11a. In the present embodiment, the touch type input device 5 is installed in a vehicle but may be installed in other machines. The operation surface 11a is rectangular and substantially similar in shape to the display 2. A user touches the operation surface 11a of the touch panel 11 with a conductor, such as a finger or a stylus, to select the desired functional item shown on the display 2 and accordingly operate an onboard device, such as an air conditioner or a car navigation system. Touching of the touch panel 11 includes, in addition to a simple touch of the operation surface 11a, swiping or flicking of the operation surface 11a in which a finger is moved along the operation surface 11a in a single direction.

Figure 2:
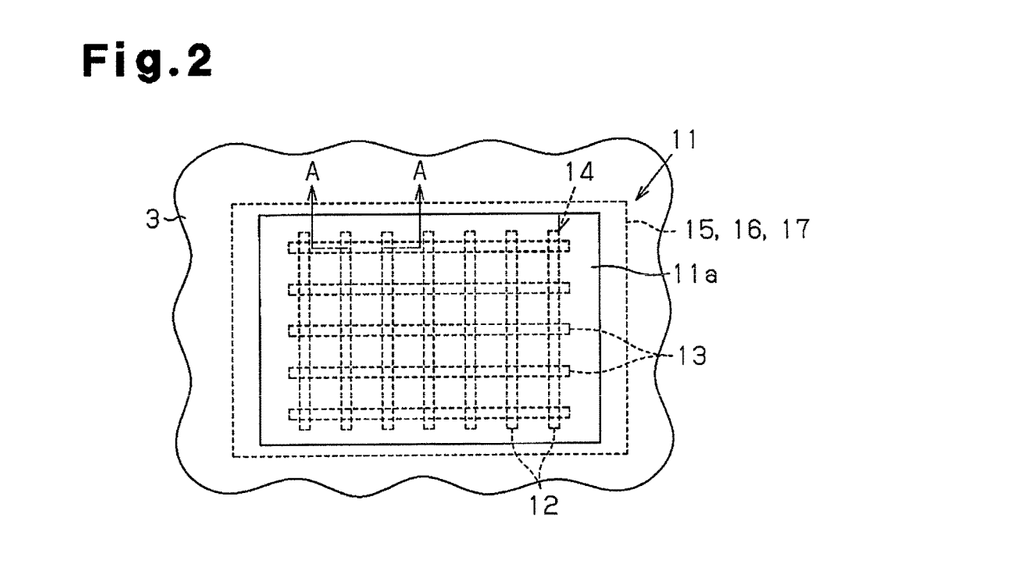
FIG. 2 is a plan view illustrating an operation surface of a touch panel on a center console.

As illustrated in FIG. 2, the touch panel 11 includes a sensor array 14. The sensor array 14 includes drive electrodes 12 and sensor electrodes 13, which are stacked on and insulated from the drive electrodes 12. The drive electrodes 12 and the sensor electrodes 13 are arranged in a grid-shaped pattern that forms capacitors C (see FIG. 3) at the intersections of the drive electrodes 12 and the sensor electrodes 13. For the sake of brevity, FIG. 2 illustrates only seven of the drive electrodes 12 and five of the sensor electrodes 13.

Figure 3:
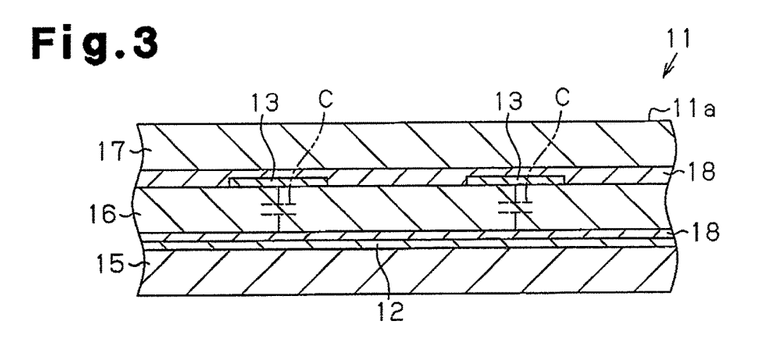
FIG. 3 is a cross-sectional view of the touch panel taken along line A-A in FIG. 2.

Referring to FIG. 3, the drive electrodes 12 are arranged on a drive substrate 15. The sensor electrodes 13 are arranged on a sensor substrate 16, which is stacked on the drive substrate 15. A cover 17 is set on the sensor substrate 16. The drive substrate 15, the sensor substrate 16, and the cover 17 are each formed from an insulative material, rectangular in shape, and larger than the operation surface 11a. The cover 17 includes an upper surface that partially forms the operation surface 11a of the touch panel 11.

The drive electrodes 12 and the sensor electrodes 13 are each formed from strips of a conductive material. The drive electrodes 12 are arranged parallel to one another extending in a first direction (X direction) within the area of the drive substrate 15 that corresponds to the operation surface 11a. The sensor electrodes 13 are arranged parallel to one another extending in a second direction (Y direction), which is orthogonal to the first direction, within the area of the sensor substrate 16 that corresponds to the operation surface 11a. Consequently, the drive electrodes 12 and the sensor electrodes 13 form the sensor array 14, which has a grid-shaped pattern, in the operation surface 11a. Further, as illustrated by the broken lines in FIG. 3, the capacitors C are formed at intersections of the drive electrodes 12 and the sensor electrodes 13. In the present embodiment, an adhesive agent 18 is used to fix the drive electrodes 12 to the drive substrate 15 and the sensor electrodes 13 to the sensor substrate 16.

Figure 4:
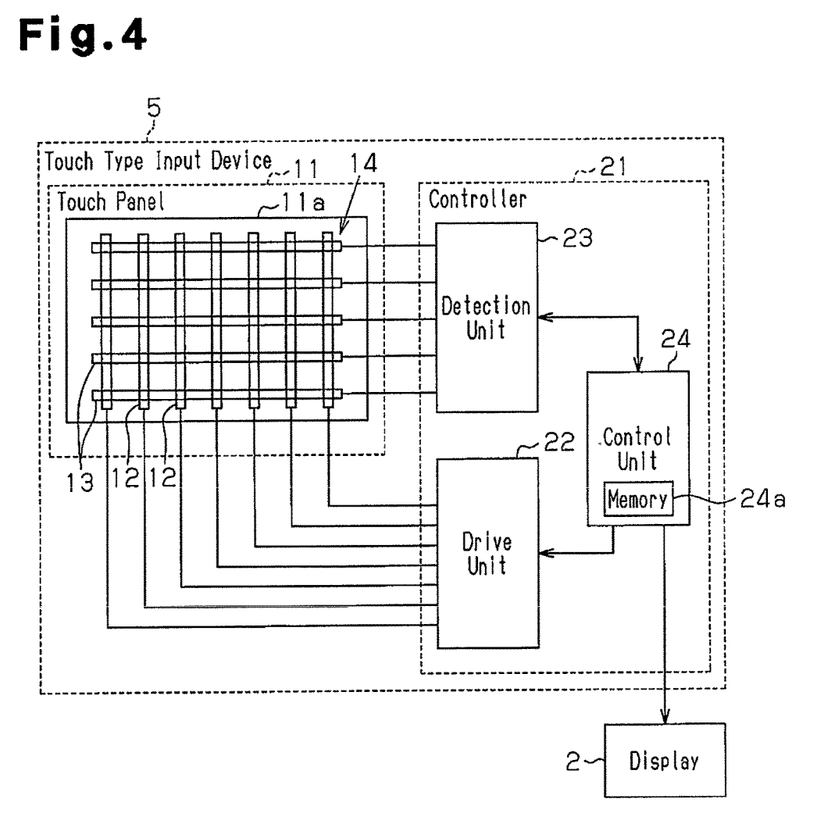
FIG. 4 is a schematic block diagram of the touch type input device.

As illustrated in FIG. 4, the touch type input device 5 further includes a controller 21 that applies a drive signal (pulse signal) to the sensor array 14 to detect a touch, that is, touching of the operation surface 11a of the touch panel 11. The controller 21 of the present embodiment employs the mutual capacitance technology and detects a touched position based on a charge-discharge current generated when the capacitance of each capacitor C changes.

The controller 21 includes a drive unit 22, which is connected to the drive electrodes 12, a detection unit 23, which is connected to the sensor electrodes 13, and a control unit 24, which controls the drive unit 22 and the detection unit 23. The drive unit 22 selects the drive electrodes 12 one by one in response to control signals from the control unit 24 and applies a drive signal to the selected drive electrode 12. The detection unit 23 selects the sensor electrodes 13 one by one in response to control signals from the control unit 24 to receive the charge-discharge current flowing through the selected sensor electrode 13 in accordance with the drive signal applied to the selected drive electrode 12. The detection unit 23 receives the charge-discharge current as an output signal. Further, the detection unit 23 detects the capacitance of each capacitor C based on the output signal from the corresponding sensor electrode 13 and outputs a detection signal, which indicates the capacitance of the capacitor C, to the control unit 24. Then, the control unit 24 detects a touch and a touched position (coordinates) from the detection signal and outputs the detection result to the display 2.

The control unit 24 is capable of detecting a touch even when a conductive foreign matter, such as a water droplet or a coin, is contacting the operation surface 11*a*. In the present embodiment, the capacitance of the capacitor C changes toward the positive side when a finger or the like contacts the operation surface 11*a*, and the capacitance changes toward the negative side when a conductive foreign matter contacts the operation surface 11*a*.

The control unit 24 includes a memory 24*a*. The memory 24*a* stores an initial reference value, which is set in advance for each capacitor C. In the present embodiment, the initial reference value is the capacitance when there is no object contacting the operation surface 11*a*. That is, the initial reference value is set to 0 (zero). Further, the memory 24*a* stores a control reference value for each capacitor C. The control reference value may be referred to as a correction reference value. The control reference value of each capacitor C is changed in accordance with whether or not a foreign matter exists on the operation surface 11*a* of the touch panel 11.

When the control unit 24 obtains the capacitance (detection signal) of each capacitor C from the detection unit 23, the control unit 24 determines whether or not a conductive foreign matter exists on the touch panel 11, that is, whether or not a foreign matter is contacting the operation surface 11*a*, based on raw data values indicating the change amount in the capacitance of each capacitor C from the initial reference value. For example, the control unit 24 determines the existence of a foreign matter when at least one of the raw data values is less than or equal to a foreign matter determination threshold. The foreign matter determination threshold is set to a predetermined negative value. When the control unit 24 determines from the raw data values that a foreign matter exists on the touch panel 11, the control unit 24 acquires the capacitance (detection signal) of each capacitor C again from the detection unit 23. Then, the control unit 24 determines whether or not another conductive foreign matter exists on the touch panel 11, that is, whether or not another foreign matter is contacting the operation surface 11*a*, based on control data values indicating the change amount in the capacitance of each capacitor C from the control reference value. For example, the control unit 24 determines the existence of a foreign material when at least one of the control data values is less than or equal to the foreign matter determination threshold. Further, the control unit 24 determines whether or not the touch panel 11 has been touched based on the control data values. For example, the control unit 24 determines that the touch panel 11 has been touched when at least one of the control data values is greater than or equal to a touch determination threshold. The touch determination threshold is set to a predetermined positive value. Of course, the control unit 24 can also determine whether or not the touch panel 11 has been touched based on the raw data values.

When the control unit 24 determines from the raw data values that a foreign matter exists on the operation surface 11*a*, the control unit 24 sets the control reference value for each capacitor C to the same value as the capacitance corresponding to the present raw data value (hereafter, referred to as the raw data reference value). In such a manner, when the control reference value is set to the raw data reference value corresponding to the raw data value of each capacitor C, the control unit 24 assumes that the capacitance for each capacitor C is zero (0) under a situation in which the foreign matter is in contact with the operation surface 11*a*. Then, the control unit 24 acquires control data values indicating the change amount in the capacitance of each capacitor C from the corresponding control reference value. When the control unit 24 determines from the raw data values that there is no foreign matter on the operation surface 11*a*, the control unit 24 sets the control reference value of each capacitor C as the initial reference value.

Further, when the control unit 24 determines from the control data values that a foreign matter exists on the operation surface 11*a*, the control unit 24 sets a new control reference value for each capacitor C to the same value as the capacitance corresponding to the present control data value (hereafter, referred to as the control data reference value). In such a manner, when the control reference value is set to the control data reference value corresponding to the control data value of each capacitor C, the control unit 24 assumes that the capacitance for each capacitor C is zero (0) under a situation in which the foreign matter is in contact with the operation surface 11*a*. Then, the control unit 24 acquires new control data values indicating the change amount in the capacitance of each capacitor C from the corresponding new control reference value. When the control unit 24 determines from the control data values that there is no foreign matter on the operation surface 11*a*, the control unit 24 sets a new control reference value to the raw data reference value for each capacitor C. When the touch type input device 5 is activated, the control reference values are set to the initial reference values.

Figure 5:
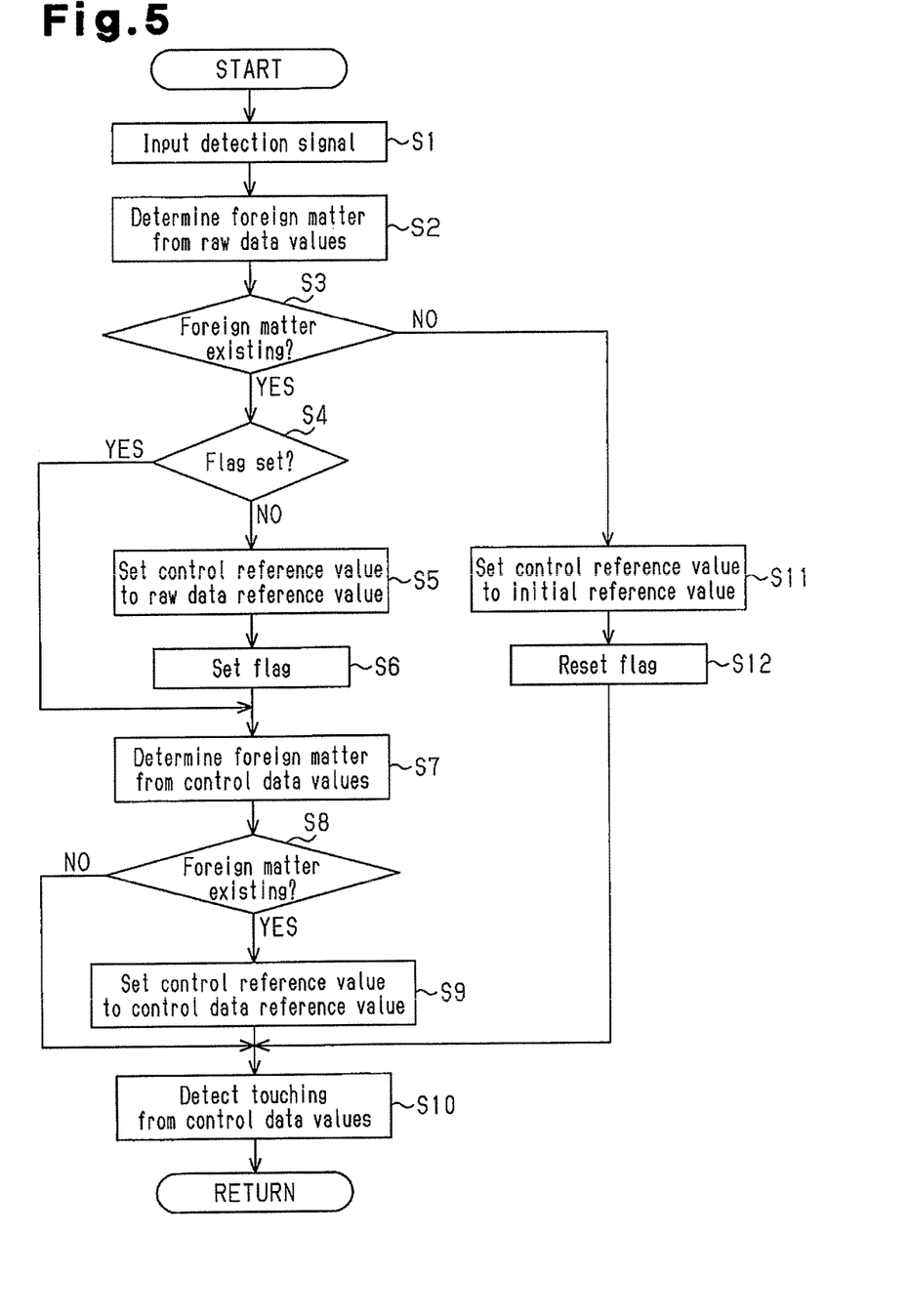
FIG. 5 is a flowchart illustrating the procedures for detecting touching of the touch panel.

The procedures taken by the control unit 24 to detect touching of the touch panel 11 will now be described with reference to the flowchart of FIG. 5. The control unit 24 executes the detection process in predetermined sampling cycles (detection cycles) to detect touching of the touch panel 11.

When the control unit 24 receives a detection signal from the detection unit 23 (step S1), the control unit 24 determines from the raw data values whether or not a conductive foreign matter exists on the operation surface 11*a* (step S2). When the control unit 24 determines that a foreign matter exists on the operation surface 11*a* (step S3: YES), the control unit 24 determines whether or not a flag is set to indicate that the control reference value differs from the initial reference value (step S4). The flag is stored in the memory 24*a*. When the flag is not set (step S4: NO), the control unit 24 sets the control reference value to the raw data reference value for each capacitor C (step S5) and sets the flag (step S6).

Then, the control unit 24 determines from the control data values whether or not a conductive foreign matter exists on the operation surface 11*a* (step S7). When the flag is set (step S4: YES), the control unit 24 skips steps S5 and S6 and proceeds to step S7 to perform a foreign matter determination based on the control data values. When the control unit 24 determines that another foreign matter exists on the operation surface 11*a* (step S8: YES), the control unit 24 sets the control reference value to the control data reference value for each capacitor C (step S9). Then, the control unit 24 detects whether or not the touch panel 11 has been touched based on the control data values newly obtained (step S10). When the control unit 24 determines from the control data values that there is no foreign matter on the operation surface 11a (step S8: NO), the control unit 24 skips step S9 and proceeds to step S10 to detect touching of the touch panel 11 from the control data values.

When the control unit 24 determines from the raw data values that there is no foreign matter on the operation surface 11a (step S3: NO), the control unit 24 sets the control reference value to the initial reference value (step S11) and resets the flag (step S12). Then, the control unit 24 proceeds to step S10 and detects touching of the touch panel 11 from the control data values.

The detection of a touch when a foreign matter is contacting the operation surface 11a of the touch panel 11 will now be described.

Figure 6A:
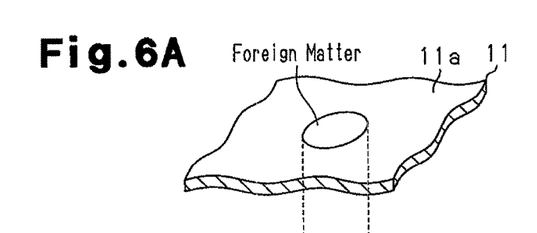
FIG. 6A is a schematic diagram illustrating the touch panel when a conductive foreign matter is contacting the operation surface.
Figure 6B:
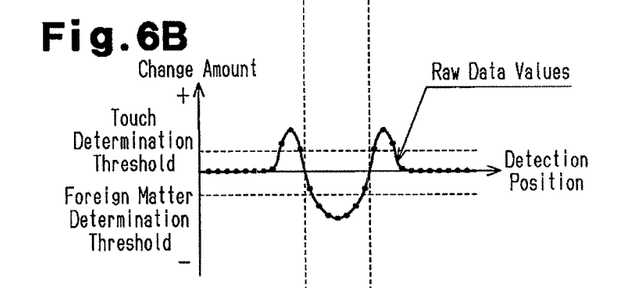
FIG. 6B is a graph plotted from raw data values taken under the condition illustrated in FIG. 6A.

Referring to FIGS. 6A and 6B, when a foreign matter contacts the operation surface 11a of the touch panel 11, the raw data values (capacitances of capacitors C) in the area contacting the foreign matter are negative values. The raw data values around the foreign matter are positive values. When each control reference value is set to the initial reference value, the control data values would be the same as the raw data values as illustrated by the double-dashed line in FIG. 6C. To facilitate understanding, FIGS. 6B and 6C use dots to show the raw data values and the control data values obtained along a single line (X direction) extending through the foreign matter. When a foreign matter exists on the operation surface 11a as illustrated in FIG. 6A, at least one of the raw data values is less than or equal to the foreign matter determination threshold. Accordingly, the control unit 24 determines that a foreign matter exists on the operation surface 11a and sets each control reference value to the raw data reference value, that is, the same value as the capacitance corresponding to the present raw data value. When the capacitance of each capacitor C is newly obtained under this situation, as illustrated by the bold line in FIG. 6C, the control data value for each capacitor C would be zero. Accordingly, if the touch panel 11 is touched under a situation in which a foreign matter exists on the operation surface 11a, the control data values obtained from the area touched by a finger change to positive values. This allows for touching of the touch panel 11 to be correctly detected.

Figure 6C:
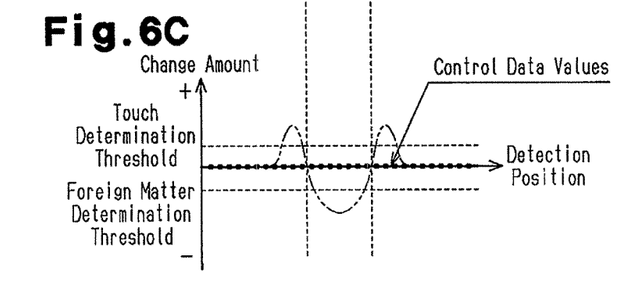
FIG. 6C is a graph plotted from control data values taken under the condition illustrated in FIG. 6A.

Under the situation illustrated in FIG. 6A, when another foreign matter (not illustrated) contacts the operation surface 11a, the newly obtained control data values change, for example, as illustrated by the double-dashed line in FIG. 6C. Accordingly, the control unit 24 determines from the control data values that another foreign matter exists on the operation surface 11a and sets each control reference value to the control data reference value, that is, the same value as the capacitance corresponding to the present control data value. When the capacitance of each capacitor C is newly obtained under this situation, as illustrated by the bold line in FIG. 6C, the control data value is zero. Accordingly, if the touch panel 11 is touched when a foreign matter exists on the operation surface 11a, the control data values obtained from the area touched by a finger change to positive values. This allows for touching of the touch panel 11 to be correctly detected.

Figure 7A:
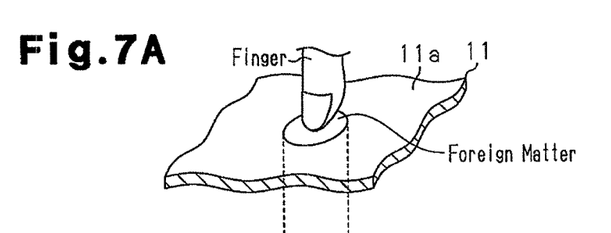
FIG. 7A is a schematic diagram illustrating the touch panel when a finger touches a conductive foreign matter on the operation surface.
Figure 7B:
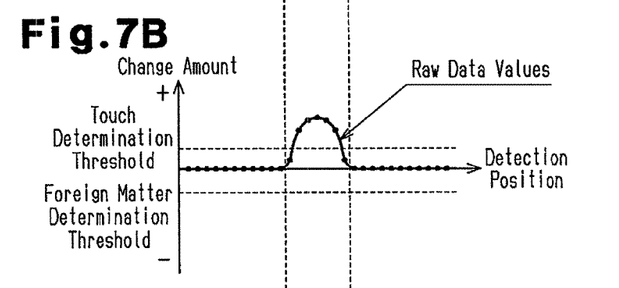
FIG. 7B is a graph plotted from raw data values taken under the condition illustrated in FIG. 7A.
Figure 7C:
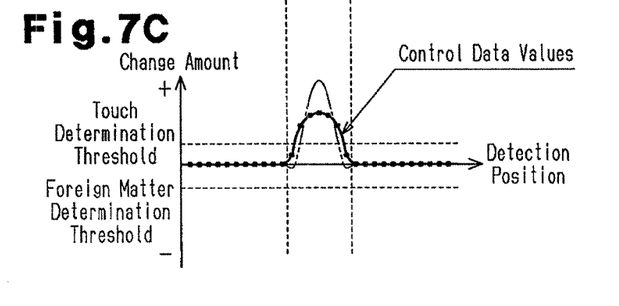
FIG. 7C is a graph plotted from control data values taken under the condition illustrated in FIG. 7A.

FIG. 7A illustrates a situation in which a finger contacts a foreign matter on the operation surface 11a. In this case, as illustrated in FIG. 7B, the raw data values in the area in which the finger and the foreign matter are located change to positive values. In other words, the raw data values change in substantially the same manner as when a large finger touches the operation surface 11a. Under the situation illustrated in FIG. 7A, the raw data values are greater than the foreign matter threshold. Accordingly, the control unit 24 determines from the raw data values that there is no foreign matter on the operation surface 11a and sets each control reference value to the initial reference value (refer to step S11 in FIG. 5). Consequently, as illustrated by the bold line in FIG. 7C, the control data values newly obtained each show the amount of change in the capacitance of the corresponding capacitor C from the initial reference value. That is, the control data values are the same as the raw data values. If the control reference values were not set to the raw data reference values, the control data values would be as illustrated by the double-dashed line in FIG. 7C.

Figure 8A:
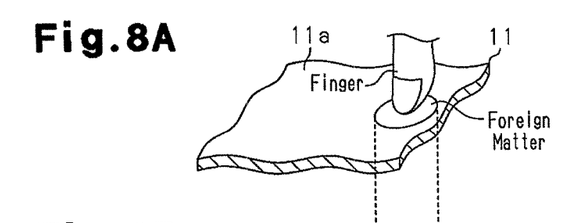
FIG. 8A is a schematic diagram illustrating the touch panel when the operation surface is swiped with a finger that is in contact with a conductive foreign matter on the operation surface.
Figure 8B:
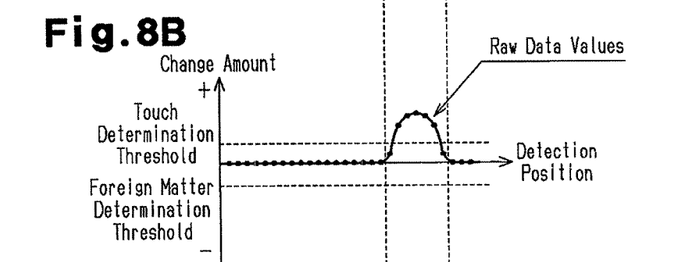
FIG. 8B is a graph plotted from raw data values taken under the condition illustrated in FIG. 8A.
Figure 8C:
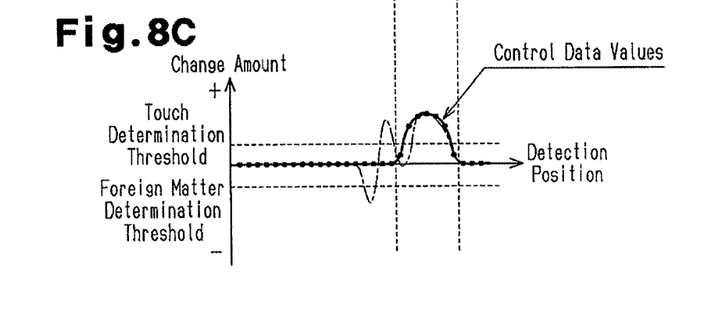
FIG. 8C is a graph plotted from control data values taken under the condition illustrated in FIG. 8A.

FIG. 8A illustrates a situation in which swiping is performed with a finger that remains in contact with a foreign matter. The finger and the foreign object move integrally with each other on the operation surface 11a. Thus, referring to FIG. 8B, the area in which the raw data values are positive changes as the finger moves. Here, if the control reference values were to be set to the raw data reference values, the control data values of the area from which the foreign matter moves away on the operation surface 11a would change in the same manner as when a foreign matter or a finger contacts the operation surface 11a as illustrated by the single-dashed line in FIG. 8C. In this regard, in the present embodiment, when the control unit 24 detects the touching of the touch panel 11 from the raw data values, the control unit 24 resets the control reference values to the initial reference values as described above. Thus, as illustrated by the bold line in FIG. 8C, the control data values are the same as the raw data values. As a result, a foreign matter is not erroneously detected as being in contact with an area from which the foreign matter has moved away. This allows for swiping of the touch panel 11 to be correctly detected.

The present embodiment has the advantages described below.

(1) The control unit 24 changes the control reference value for each capacitor C in accordance with whether or not a foreign matter exists. Then, the control unit 24 obtains, as the control data value, the amount of change in the capacitance of each capacitor C from the corresponding control reference value. The control unit 24 detects the touching of the touch panel 11 from the control data values. Accordingly, even when a foreign matter remains in contact with the operation surface 11a, the control unit 24 is able to correctly recognize changes in the capacitance when a finger touches the operation surface 11a. This allows for the touching of the touch panel 11 to be correctly detected. Further, when the control unit 24 determines from the raw data values that a foreign matter exists, the control unit 24 sets the control reference values to the raw data reference values that are the same as the present raw data values. When the control unit 24 determines from the raw data values that there is no foreign matter, the control unit 24 sets the control reference values to the initial reference values. Thus, even when the touch panel 11 is swiped with the finger remaining in contact with a foreign matter, the control data values are not changed in an area of the operation surface 11a from which the foreign matter has moved away. This allows for the swiping to be correctly detected. In the present embodiment, the touch type input device 5 is installed in the vehicle. When the user is driving the vehicle, the user may not be able to readily remove a foreign matter from the touch panel 11. Thus, the structure according to the present embodiment improves the convenience by allowing for the detection of a touch even when a foreign matter is in contact with the operation surface 11a.

(2) When the control unit 24 determines from the raw data values that a foreign matter exists, the control unit 24 further determines from the control data values (newly obtained capacitances) whether or not another foreign matter exists. Thus, when a foreign matter comes into contact with the operation surface 11a, the control unit 24 is able to determine after a certain period of time whether another foreign matter is in contact with the operation surface 11a. Further, when the control unit 24 determines the existence of a foreign matter from the control data values, the control unit 24 sets each control reference value to the control data reference value that is the same as the present control data value. On the other hand, when the control unit 24 determines from the control reference values that there is no foreign matter, the control unit 24 sets each control reference value to the raw data reference value, that is, the same value as the present control reference value. Thus, even when different foreign matters contact the operation surface 11a at different timings, the control unit 24 is able to correctly recognize changes in the capacitance of each capacitor C when a finger or the like touches the operation surface 11a. This allows for the touching of the touch panel 11 to be correctly detected.

It should be apparent to those skilled in the art that the present invention may be embodied in many other specific forms without departing from the spirit or scope of the invention. Particularly, it should be understood that the present invention may be embodied in the following forms.

In the above embodiment, the foreign matter determination based on the control data values may be omitted. More specifically, steps S7 to S9 may be omitted from the flowchart of FIG. 5. In this case, whenever the control unit 24 determines the existence of a foreign matter from the raw data values, the control unit 24 may set the control reference value of each capacitor C to the raw data reference value corresponding to the present raw data value.

In the above embodiment, the control unit 24 determines that a foreign matter is existing when at least one of the raw data values is less than or equal to the foreign matter determination threshold. Instead, the control unit 24 may determine that a foreign matter is existing when at least one of the raw data values is less than or equal to a negative first foreign matter threshold and at least another one of the raw data values is greater than or equal to a positive second foreign matter threshold. This is because the raw data values in the area in which a foreign matter is existing change toward the negative side, and the raw data values in the area around the foreign matter change toward the positive side (see FIG. 6B). Further, other foreign matter determination conditions may be used to perform foreign matter determination. The foreign matter determination that is based on the control data values may also be modified in the same manner. Further, the condition for detecting the touching of the touch panel 11 does not have to be at least one of the control data values being greater than or equal to a touch determination threshold.

In the above embodiment, when a foreign matter contacts the operation surface 11a, the same values as the raw data values are used as the raw data reference values. However, the raw data reference values may be set in accordance with the raw data values and do not have to be completely the same as the raw data values. In the same manner, the control data reference values do not have to be completely the same as the control data values when the contact of a foreign matter with the operation surface 11a is determined. Further, each initial reference value does not have to be completely the same as the capacitance when there is no object on the operation surface.

The present examples and embodiments are to be considered as illustrative and not restrictive, and the invention is not to be limited to the details given herein, but may be modified within the scope and equivalence of the appended claims.

The invention claimed is:

1. A touch type input device comprising:
a touch panel including a sensor array and an operation surface, wherein the sensor array includes drive electrodes and sensor electrodes insulated from and stacked on the drive electrodes, wherein the drive electrodes and the sensor electrodes are arranged in a grid-shaped pattern that forms capacitors at intersections of the drive electrodes and the sensor electrodes; and
a controller that applies a drive signal to the drive electrodes and detects touching of the operation surface of the touch panel from changes in capacitance of each capacitor, wherein the controller is configured so that before detecting the touching, the controller determines whether or not conductive foreign matter exists on the operation surface by comparing a foreign matter determination threshold and raw data values indicating a change amount in the capacitance of each capacitor from an initial reference value that is set in advance for each capacitor,
the controller determines whether or not the operation surface has been touched by comparing a touch determination threshold, distinct from the foreign matter determination threshold, and control data values indicating a change amount in the capacitance of each capacitor from a control reference value that is changed for each capacitor in accordance with whether or not the conductive foreign matter exists,
when the controller determines from the raw data values that the conductive foreign matter exists on the operation surface, the controller determines whether or not the operation surface has been touched by using a raw data reference value corresponding to a present raw data value of each capacitor as the control reference value of each capacitor, and
when the controller determines from the raw data values that the conductive foreign matter does not exist on the operation surface, the controller determines whether or not the operation surface has been touched by using the initial reference value of each capacitor as the control reference value of each capacitor.

2. The touch type input device according to claim 1, wherein the controller is further configured so that
when the controller determines from the raw data values that the conductive foreign matter exists on the operation surface, the controller determines whether or not a further conductive foreign matter exists on the operation surface from the control data values,
when the controller determines from the control data values that the further conductive foreign matter exists on the operation surface, the controller sets the control reference value of each of the capacitors to a control data reference value corresponding to the present control data value, and
when the controller determines from the control data values that the further conductive foreign matter does not exist on the operation surface, the controller sets the control reference value of each of the capacitors to the raw data reference value corresponding to the capacitor.

3. A method for detecting touching of a touch panel regardless of the existence of conductive foreign matter on the touch panel, wherein the touch panel includes a sensor array and an operation surface, the sensor array includes drive electrodes and sensor electrodes insulated from and stacked on the drive electrodes, the drive electrodes and the sensor electrodes are arranged in a grid-shaped pattern that forms capacitors at intersections of the drive electrodes and the sensor electrodes, the method comprising:

applying a drive signal to the drive electrodes;

detecting capacitance of each capacitor from a charge-discharge current flowing through a corresponding one of the sensor electrodes in accordance with the drive signal applied to a corresponding one of the drive electrodes; and detecting touching of the operation surface of the touch panel from changes in capacitance of each capacitor, the detecting touching of the operation surface including before detecting the touching, determining whether or not conductive foreign matter exists on the operation surface by comparing a foreign matter determination threshold and raw data values indicating a change amount in the capacitance of each capacitor from an initial reference value that is set in advance for each capacitor, and determining whether or not the operation surface has been touched by comparing a touch determination threshold, distinct from the foreign matter determination threshold, and control data values indicating a change amount in the capacitance of each capacitor from a control reference value that is changed for each capacitor in accordance with whether or not the conductive foreign matter exists, wherein the determining whether or not the operation surface has been touched includes:

when the raw data values indicate the existence of the conductive foreign matter on the operation surface, determining whether or not the operation surface has been touched by using a raw data reference value corresponding to a present raw data value of each capacitor as the control reference value of each capacitor, and when the raw data values do not indicate the existence of the conductive foreign matter on the operation surface, determining whether or not the operation surface has been touched by using the initial reference value of each capacitor as the control reference value of each capacitor.

4. The method according to claim 3, wherein the detecting touching of the operation surface further includes when the raw data values indicate the existence of the conductive foreign matter on the operation surface, determining whether or not a further conductive foreign matter exists on the operation surface from the control data values, when the control data values indicate the existence of the further conductive foreign matter on the operation surface, setting the control reference value of each capacitor to a control data reference value corresponding to the present control data value, and when the control data values do not indicate the existence of the further conductive foreign matter on the operation surface, setting the control reference value of each capacitor to the raw data reference value corresponding to the capacitor.

* * * * *

UNITED STATES PATENT AND TRADEMARK OFFICE
CERTIFICATE OF CORRECTION

PATENT NO. : 9,563,311 B2
APPLICATION NO. : 14/264393
DATED : February 7, 2017
INVENTOR(S) : S. Yamaguchi et al.

It is certified that error appears in the above-identified patent and that said Letters Patent is hereby corrected as shown below:

On the Title Page

Assignee, please add -- SMK CORPORATION, Tokyo (JP) --.

Signed and Sealed this
Third Day of October, 2017

Joseph Matal
*Performing the Functions and Duties of the*
*Under Secretary of Commerce for Intellectual Property and*
*Director of the United States Patent and Trademark Office*